Feb. 8, 1949.   B. W. WRIGHT   2,460,914
WELDING GUIDE
Filed Oct. 24, 1945   2 Sheets-Sheet 1

INVENTOR
Ben W. Wright.
BY
J. P. Kerper
ATTORNEY

Feb. 8, 1949. B. W. WRIGHT 2,460,914
WELDING GUIDE
Filed Oct. 24, 1945 2 Sheets-Sheet 2
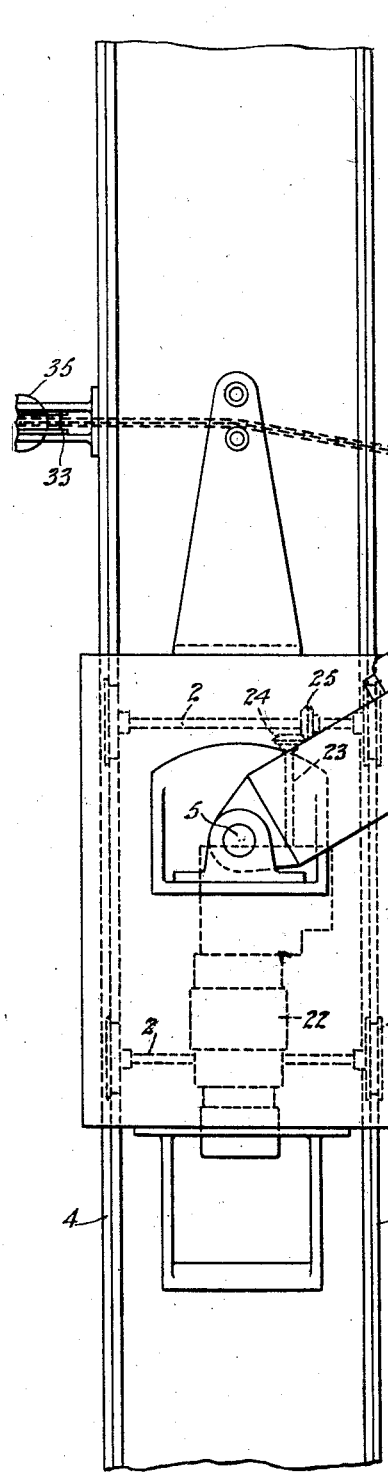
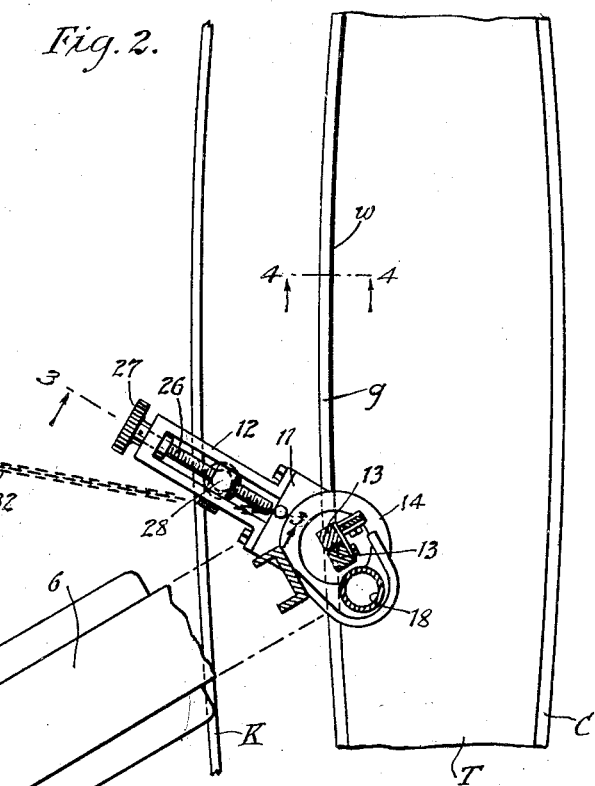
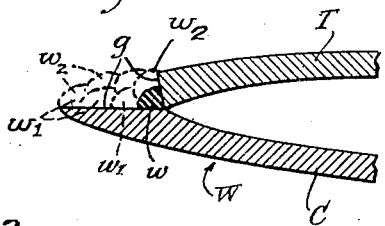
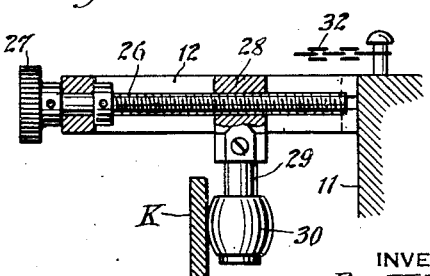
INVENTOR
Ben W. Wright
BY
ATTORNEY Patented Feb. 8, 1949

2,460,914

UNITED STATES PATENT OFFICE 2,460,914

WELDING GUIDE

Ben W. Wright, Boonton, N. J., assignor to Curtiss-Wright Corporation, a corporation of Delaware Application October 24, 1945, Serial No. 624,145

6 Claims. (Cl. 219—8)

My invention relates to a welding guide for use in automatic welding apparatus.

My invention has particular reference to apparatus for attaching a plurality of layers of weld metal on a suitable surface preferably in side-by-side adhering relation.

My invention has further reference to apparatus for use in a welding method involving the first step of effecting relative movement between a welding rod and the work to attach a layer of weld metal thereto, the second step of changing the positional relation, transversely of the layer of weld metal, between the welding rod and the work, and the third step of again effecting relative movement between the welding rod and the work to attach another layer of weld metal to the work.

Various other objects, advantages and features of my invention will become apparent from the following detailed description.

My invention resides in the welding apparatus and arrangements of the character hereinafter described and claimed.

For an understanding of my invention and for an illustration of one of the arrangements utilizable for practicing the same, reference is to be had to the accompanying drawings, in which:

Fig. 2 is a plan view showing part of the apparatus illustrated in Fig. 1;

Fig. 3 is a vertical sectional view, partly in elevation, taken on the line 3—3 of Fig. 2 looking in the direction of the arrows; and Fig. 4 is a transverse sectional view taken on the line 4—4 of Fig. 2.

Figure 1:
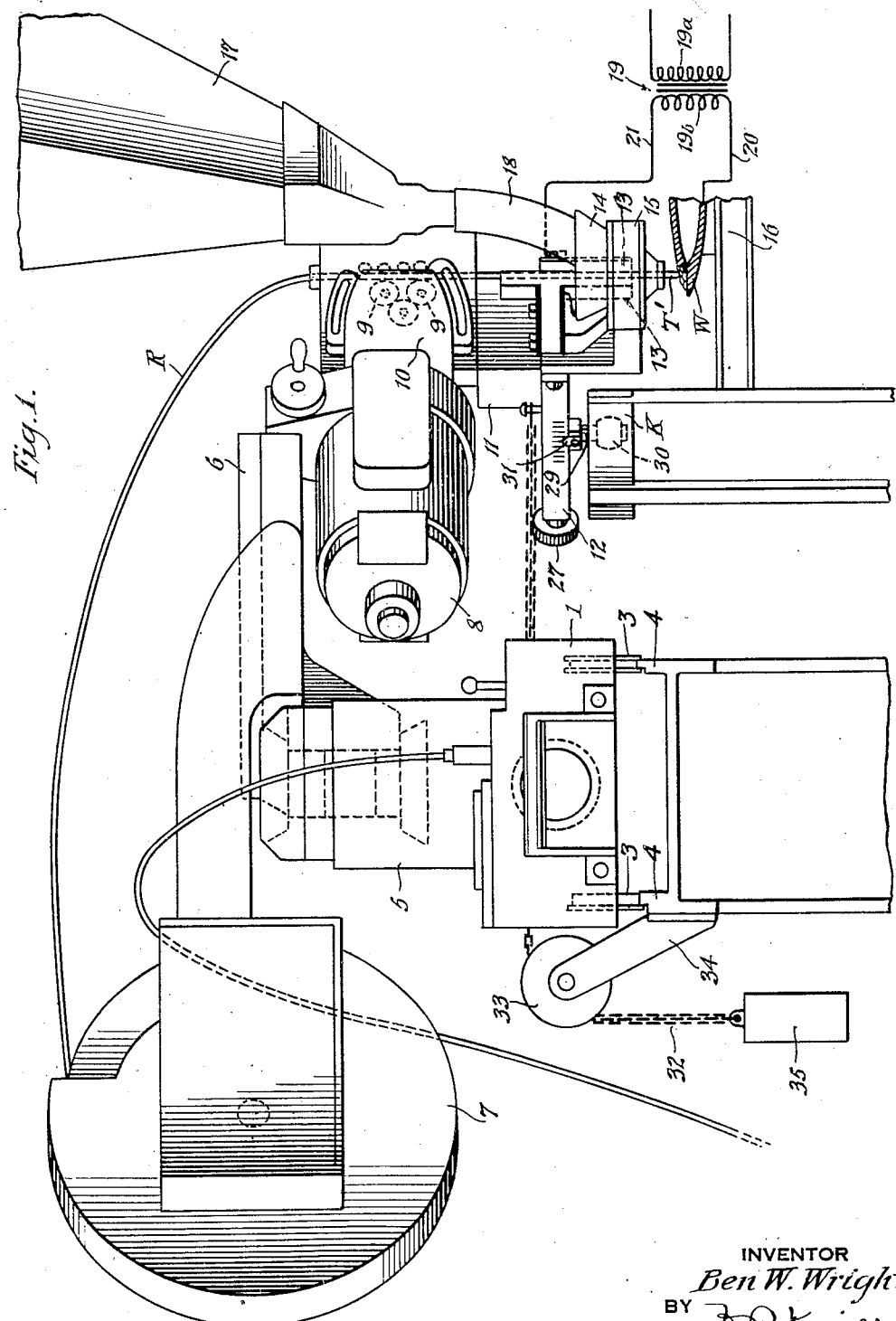
Figure 1 is an elevational view, partly diagrammatic, illustrating welding apparatus incorporating the invention.

Referring to Fig. 1, I have shown a carriage 1 which comprises a pair of spaced axles 2, Fig. 2, carrying the respective wheels 3 supported by tracks 4, respectively, the latter being supported in any suitable manner. Secured to the carriage 1 is a standard 5 on which is freely pivoted a bracket 6 which, at one end, carries a rotatable rod reel 7. At its other end, the bracket 6 carries a housing for a motor 8 which operates wheels 9 for feeding a welding rod R, said wheels 9 being disposed in a housing 10 having secured thereto a support 11 which has fixed thereto a laterally extending arm 12 utilizable as hereinafter described. Secured to the support 11 are a pair of spaced contact members 13, 13 which extend into a funnel 14 supported in a complementary circular section 15 of the support 11. As shown, the welding rod R passes between the contact members 13, 13 and through the open lower portion of the funnel 14 and circular section 15, the lower end or welding tip T' of said welding rod B being close to the work W which, as shown, although not necessarily, is a section of a hollow steel propeller blade which is held in fixed position upon a supporting platform 16 in any suitable manner. During the welding operation, suitable welding flux is passed from a hopper 17 which is secured to the housing 10, the flux passing from the hopper 17 through a suitable passage 18 to the funnel 14. As the welding operation proceeds, the flux passes from the funnel 14 onto the work W.

Welding current is supplied to the described apparatus by a transformer 19 having a primary winding 19a and a secondary winding 19b, one terminal of the latter being connected to the work W by a conductor 20, the other terminal being connected by a conductor 21 to the contact members 13, 13 which, in suitable manner, are biased into engagement with the rod R so as to have good electrical contact therewith while permitting said rod R to move therebetween as the welding operation proceeds.

Referring to Fig. 2, the carriage 1 moves longitudinally upon the tracks 4 under the control of an electric motor 22, the armature of which is geared to a shaft 23 which carries a gear 24 meshing with a gear 25 fast on the axle 2. The tip of the welding rod R partakes of the longitudinal motion of the carriage 1 but, as shown by Fig. 1, may move to the right or left with respect thereto by reason of the pivotal connection between the standard 5 and the bracket 6, this latter motion being controlled as hereinafter described.

Welding apparatus of the general character referred to above is well known in the art and is an example of one of several forms of known apparatus which may be employed when practicing my invention. The speed of the motor 22 may be controlled in known manner and by known mechanism to effect translatory movement of the motor 22 and associated parts along or with respect to the rails 4 at a desired speed.

More particularly in the disclosed form of the invention and as illustrated in Figs. 2 and 4, the section of the hollow propeller blade constituting the work W is formed from a camber plate C and a thrust plate T. Propeller blades of this type are well known in the art and, as indicated, the area of the thrust plate T is less, to suitable degree, than the area of the camber plate C and, accordingly, when the two plates are associated in proper relation with respect to each other, a groove or channel $g$ is formed at each edge of the propeller blade. The width of this groove, throughout at least a portion of the propeller blade, is such that it is only incompletely filled with weld metal when the welding rod R is caused to make only one pass or transit with respect thereto. As a matter of fact, if the groove $g$ is to be properly filled with weld metal throughout the width thereof, it is necessary for the welding rod R to be passed a plurality of times longitudinally thereof. This, in accordance with the invention, is accomplished in a novel manner as hereinafter described.

Assuming that the work W comprising the plates T and C are suitably held in fixed relation with respect to each other on the platform 16, a cam bar or member K is supported in fixed position at one side of said work W. The configuration of the cam bar K is so chosen that it is symmetrical with respect to the groove $g$ which, as will be understood, is of curved configuration as imposed by the curved edge of the propeller blade.

The arm 12 hereinbefore described may be slotted as indicated in Fig. 2. Extending longitudinally through this slot and journaled in the arm 12 is a screw 26 having an operating wheel 27 at one end thereof. Coactable with the screw 26 is a nut member 28 having an integral depending stem 29 on which is journaled a roller 30 coactable with the aforesaid cam bar K. If desired, as shown in Fig. 1, the nut member 28 may carry a pointer 31 which coacts with a scale suitably formed on the arm 12.

As hereinbefore stated, the bracket 6 is pivoted on the standard 5. Secured to the support 11 (which is carried by the bracket 6) is one end of a flexible member 32 such as a chain which passes over a roller 33 journaled in a bracket 34 secured to one of the tracks 4, the other end of the member 32 carrying a weight 35. It will be understood that, with this arrangement, the bracket 6 and parts carried thereby are biased in a counter-clockwise direction, Fig. 2, and, accordingly, the roller 30 is held in engagement with the cam bar K at all times. Obviously, any other suitable biasing arrangement may be utilized in lieu of the one described above.

In view of the foregoing, it will be understood that operation of the wheel 27 causes the bracket 6 to move either clockwise or counter-clockwise with respect to the standard 5. In so doing, the tip T' of the welding rod R is located with accuracy in a desired position and, as will be evident, the wheel 27 may thus be operated to position the welding rod tip T' vertically above a location near the inner corner of the groove $g$ as defined by the meeting surfaces of the plates C and T. Then, with the carriage 1 so positioned that the welding rod tip T' is properly located with respect to the groove $g$ and with the transformer 19 together with the rod-feeding motor 8 energized, the motor 22 is operated to move said carriage 1 in the proper direction and at the proper speed to cause a deposition of a layer of weld metal $w$ in the groove $g$ throughout a desired portion of the length thereof. As will be noted from Fig. 4, the width of this layer of weld metal $w$ is substantially less than that of the groove $g$. Hence, in accordance with the invention, the carriage 1 is returned to its original position and, by manipulation of the wheel 27, the bracket 6 is moved to locate the tip T' of the welding rod R vertically above a location at one side of but closely adjacent the aforesaid layer of weld metal $w$. Thereupon, the operation is repeated and a second layer of weld metal $w1$ is deposited in side-by-side preferably adhering relation with respect to the layer of weld metal $w$ which was first deposited.

When the groove $g$ has a width as disclosed, the combined width of the layers of weld metal $w$ and $w1$ is less than that of said groove $g$ and, therefore, in the manner described, such additional side-by-side layers of weld metal $w1$ are deposited as may be necessary in order to obtain a weld metal layer throughout the entire width of the groove. Finally, by proper manipulation of the apparatus in a manner generally the same as described, upper layers of side-by-side weld metal $u2$ may be deposited on the previously deposited layers of weld metal $w$, $w2$.

It is an important feature of the invention, then, that welding apparatus of known form may have associated therewith mechanism such, for example, as the hereinbefore described cam bar K and parts controlled thereby for effecting pivotal movement of the bracket 6, or equivalent. With such an arrangement, side-by-side layers of weld metal may readily and easily be deposited in a groove or on a selected plane or other surface.

It shall be understood that any suitable arrangement other than the one described above may be utilized for causing the welding head and electrode tip to travel along side-by-side paths in order to deposit the respective side-by-side layers of weld metal.

Although the invention has been described with respect to an arrangement wherein the work is stationary and the welding head movable with respect thereto, it shall be understood that the invention is not to be thus limited. If desired, the work may move, for each welding pass, with respect to a stationary welding head and, in order to obtain the side-by-side layer of weld metal, either the welding head or the work may be shifted after each pass.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. Welding apparatus comprising a support for the work, a second support, means carried by said second support for feeding a welding rod toward the work, means for effecting relative movement between the supports to attach a layer of weld metal to the work, a cam secured to said work support, guiding mechanism carried by said second named support for cooperation with said cam, and means for adjusting the positional relation of said mechanism to said carriage to thereby vary the positional relation of said welding rod with respect to the work whereby successive side-by-side layers of weld metal may be deposited on the work.

2. Welding apparatus comprising a carriage, means carried thereby for feeding a welding rod toward the work, means for moving the welding carriage to deposit a layer of weld metal on the work, a cam secured to said work support, guiding mechanism carried by said carriage for cooperation with said cam, and means for adjusting the positional relation of said mechanism to said carriage to thereby vary the positional relation of said welding rod with respect to the work whereby successive side-by-side layers of weld may be deposited on the work.

3. Welding apparatus comprising a carriage, means carried thereby for feeding a welding rod toward the work, means for moving the welding carriage to deposit a layer of weld metal on the work, a cam secured to said work support, guiding mechanism carried by said carriage and comprising a roller coactable with said cam, and means for adjusting the position of said roller with respect to said carriage to thereby vary the positional relation of said welding rod with respect to the work whereby successive side-by-side layers of weld metal may be deposited on the work.

4. Welding apparatus comprising a workpiece support, a guide cam secured thereto having a contour corresponding to a desired weld path, a welding head movable over said support, both along said cam and laterally thereof, means carrying said head for said movement, a camfollower secured to said welding head, unitary means for adjusting the lateral distance between said camfollower and said head, and means to enforce engagement of said camfollower with said cam; said head being movable along and over said workpiece support for a welding pass while being guided laterally by said cam, and, by adjusting said means, being movable in another pass over said workpiece support parallel to and spaced from the first pass while being guided laterally by said cam.

5. Welding apparatus comprising a workpiece support, a guide cam secured thereto having a contour corresponding to a desired weld path, a welding head movable over said support, both along said cam and laterally thereof, means carrying said head for said movement, a camfollower secured to said welding head, unitary means for adjusting the lateral distance between said camfollower and said head, and means to enforce engagement of said camfollower with said cam; said head being movable along and over said workpiece support for a welding pass while being guided laterally by said cam, and, by adjusting said means, being movable in another pass over said workpiece support parallel to and spaced from the first pass while being guided laterally by said cam; said unitary adjusting means comprising a screw connection between said head and camfollower, the screw axis lying at an angle to the weld path.

6. A guide arrangement for a movable welding electrode carrier comprising a bracket extending outwardly from said carrier, a screw mounted upon said bracket the screw axis extending in a direction angled relative to the normal direction of movement of said electrode carrier over work to be welded, a member movably mounted for position adjustment by rotation of said screw, a roller carried by said member and rotatable on an axis substantially parallel to said electrode, and a guide track engaged by said roller secured to the work to be welded.

BEN W. WRIGHT.

REFERENCES CITED

The following references are of record in the file of this patent:

UNITED STATES PATENTS

| Number | Name | Date |
|---|---|---|
| 1,532,842 | Stresau | April 7, 1925 |
| 1,860,172 | Chapman | May 24, 1932 |
| 1,884,645 | Ford | Oct. 25, 1932 |
| 1,886,503 | Shockey | Nov. 8, 1932 |
| 1,979,264 | Hodge et al. | Nov. 6, 1934 |
| 2,404,383 | Kornblutt | July 23, 1946 |